March 17, 1970  R. L. TABOR ET AL  3,500,992
TRANSFER SYSTEM

Filed Aug. 22, 1967  5 Sheets-Sheet 1

INVENTORS
RALPH L. TABOR
WALTER GREENWOOD
PETER J. MANETTA
BY Whittemore, Hulbert
& Belknap
ATTORNEYS INVENTORS
RALPH L. TABOR
WALTER GREENWOOD
PETER J. MANETTA
BY Whittemore, Hulbert
& Belknap
ATTORNEYS

United States Patent Office 3,500,992
Patented Mar. 17, 1970

3,500,992
TRANSFER SYSTEM
Ralph L. Tabor, Birmingham, Walter Greenwood, Dearborn, and Peter J. Manetta, Warren, Mich., assignors to Simplex Corporation, Detroit, Mich., a corporation of Michigan
Filed Aug. 22, 1967, Ser. No. 662,353
Int. Cl. B65g 25/04
U.S. Cl. 198—219        7 Claims

ABSTRACT OF THE DISCLOSURE

A transfer system having multiple aligned stations, means at every station for sensing the presence or absence of an article, a carrier normally located at each station of the system except the final station, and means responsive to the sensing means for elevating the carrier at each station posterior to the foremost empty station, for moving such carriers forwardly to the next succeeding station, lowering the carriers at the next succeeding stations to deposit articles at the next succeeding stations, and for returning the carriers to their starting position.

CROSS-REFERENCE TO RELATED APPLICATION

The present application discloses an invention similar to the subject matter disclosed in applicants' prior copending application Ser. No. 578,094, filed Sept. 8, 1966, and entitled "Accumulating Feed System."

BACKGROUND OF THE INVENTION

The invention relates to a transfer system such as is in common use today in assembly operations. For example, the present equipment may be used to maintain a supply of an engine component such for example as a crankshaft, at an assembly station. It is desired to insure that an article is replaced in the final or delivery station of the system promptly upon removal of an article therefrom. It is also desirable to so control the system that if an article is removed from an intermediate station, the system will automatically advance articles to the rear of such station so as to maintain the system filled at all times.

It is particularly desirable to accomplish the foregoing results by mechanical sensing and control means which are not subject to the unavoidable failures encountered with electrically or electronically controlled systems.

SUMMARY OF THE INVENTION

In accordance with the foregoing a system is provided which includes a series of stations, each station except the final discharge station, having a carrier associated therewith. Each station is provided with means for sensing the presence or absence of an article at short intervals. If an article is removed from the final or delivery station or from any intermediate station, the sensing means activates the carriers so as to elevate a carrier at each station posterior to the foremost station at which absence of an article is sensed. Thus, if an article is removed from the final or delivery station, the carriers of every station in the system are activated. On the other hand, if an article remains at the final or delivery station but another article is removed from an intermediate station, the carriers anterior to the station from which an article has been removed, are activated and articles are advanced so as to fill up the system.

Means are provided for moving the carriers vertically so as to raise an article in its station, for advancing the activated carriers longitudinally, for lowering the carriers to deposit the articles at the next succeeding stations, and for returning the carriers to initial position.

It is an object of the present invention to provide a system as described in the foregoing characterized by a completely mechanical sensing and control system.

It is a further object of the present invention to provide a system including a slide having a multiplicity of carriers connected thereto, means responsive to the presence or absence of articles at the stations of the system for raising carriers from inoperative position to operative position at each station in rear of the foremost empty station, means for elevating the slide to thereby move the elevated carriers and to lift the associated article from its station, advancing the slide, lowering the slide to deposit articles at the next succeeding station, and returning the slide to initial position, return movement of the slide effecting lowering of the elevated carriers to inoperative or idle position.

Other objects and features of the invention will become apparent as the description proceeds, especially when taken in conjunction with the accompanying drawings, illustrating a preferred embodiment of the invention.

DESCRIPTION OF THE PREFERRED EMBODIMENT

Figure 1:
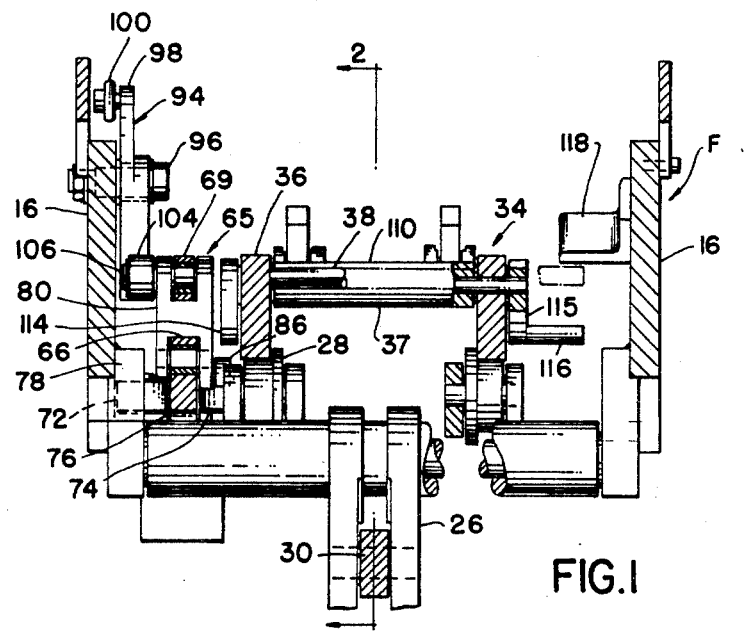
FIGURE 1 is a fragmentary transverse sectional view through the transfer system.

The transfer system comprises an elongated frame F made up of posts 10, cross members 12, an enlongated rail 14, plates 16 fixedly connected to the posts 10 adjacent the tops thereof, the plates being interconnected by cross members 18 and each having adjacent its upper edge a guard rail 20.

Secured at intervals to the plates 16 are depending brackets 22 to which are pivoted as indicated at 24, levers 26 having slide supporting rollers 28 at their upper ends. The levers 26 are interconnected by a link 30 and one of the levers is connected to actuating means such for example as a piston rod 32 connected to a piston within an actuating cylinder (not shown).

Mounted for longitudinal movement on the rollers 28 is a slide indicated generally at 34 and comprising elongated bars 36 interconnected by cross ties 37 and stop rods 38, the purpose of which will later be described.

Figure 2:
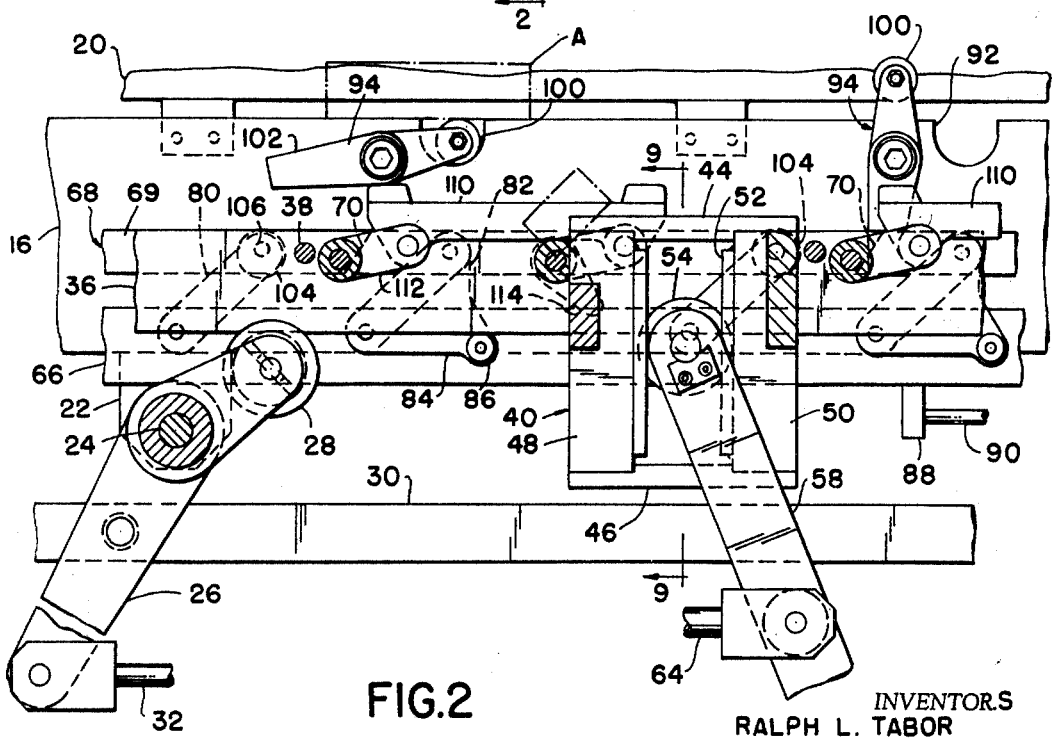
FIGURE 2 is a fragmentary sectional view on the line 2—2, FIGURE 1.
Figure 9:
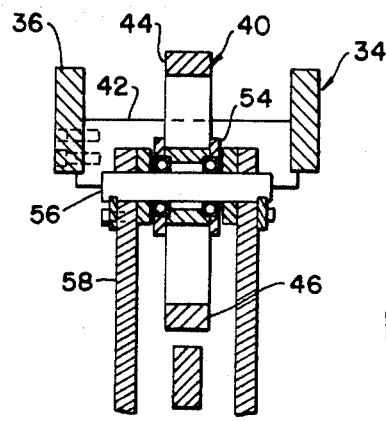
FIGURE 9 is a sectional view on the line 9—9, FIGURE 2.
Figure 10:
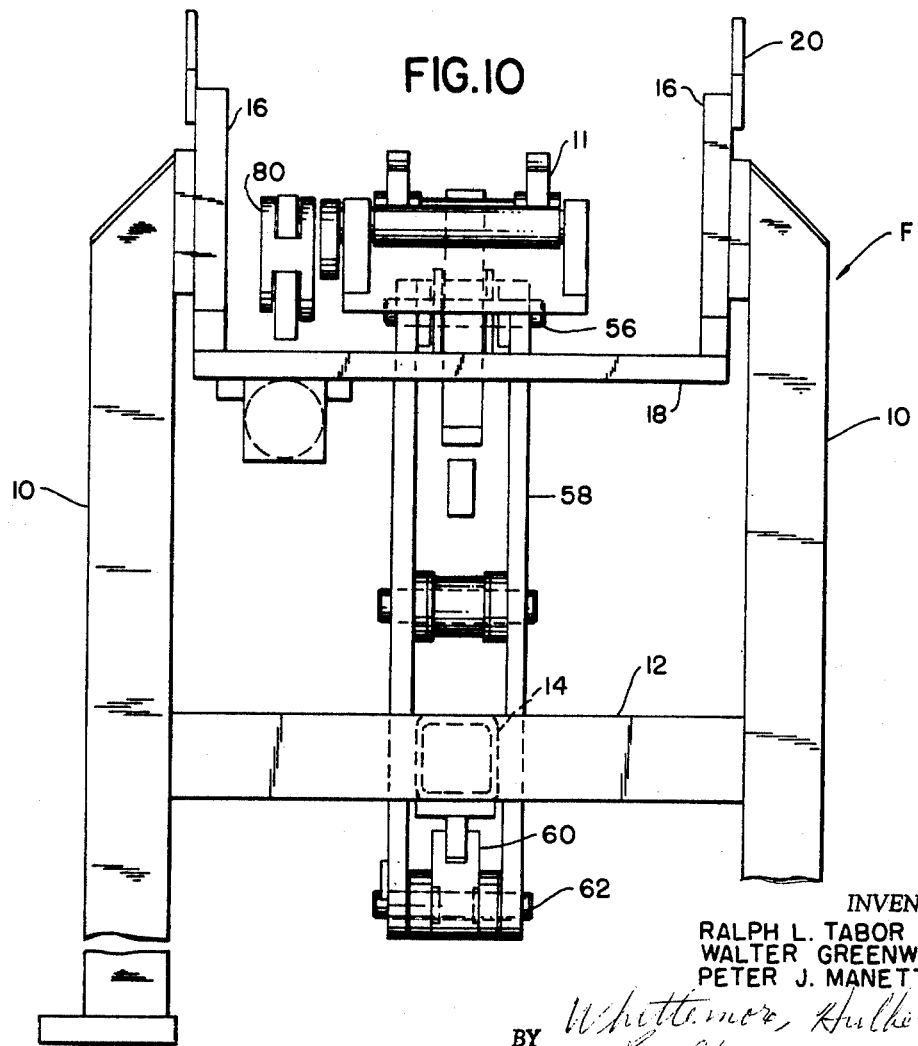
FIGURE 10 is an end view with some parts omitted.

Means are provided for effecting longitudinal movement of the slide 34 and this mechanism is best illustrated in FIGURES 2 and 9 as comprising a bearing block 40 connected between bars 36 by a transverse element 42, the bearing block including top and bottom cross ties 44 and 46 respectively, and spaced vertical members 48 and 50. Members 48 and 50 are each provided with a hardened flat bearing element 52 which cooperate with a roller 54 carried by a shaft 56 interconnecting the upper ends of actuating arm structure 58. The lower end of the arm structure 58 is pivotally connected to a bracket 60 which in turn is supported by the rail 14, the pivot connection between the arm structure 58 and the bracket 60 including a pivot pin 62. Intermediate its ends, the arm structure 58 is connected to a piston rod 64 of an actuating piston carried by the stationary frame F.

Also carried by the frame F and specifically, by the plates 16, is sensing and control mechanism 65 including a lower continuous bar or strip 66 and an upper sectionalized or articulated bar or strip 68. The articulated bar or strip 68 comprises separate strip elements 69 having inclined end portions as indicated at 70. The arrangement is perhaps best illustrated in FIG. 4 where one of the strip elements, here designated 69a, is shown as elevated from the adjacent strip element 69b.

The lower continuous strip 66 is guided between rollers 72 and 74 and is supported on rollers 76, the rollers being suitably mounted on a bracket 78 welded to one of the side plates 16 of the frame F. The individual strip elements 69 are each pivotally connected to the lower continuous strip 66 by links, each element being connected by a simple link 80 and by a compound link 82 having an actuating arm 84 and a roller 86 connected thereto for a purpose which will presently appear.

The lower continuous strip 66 is adapted to be actuated in forward and reverse movements by actuating means such as a bracket 88 connected to a piston rod 90 which in turn is actuated by a piston operating in a cylinder mounted on the frame and not illustrated herein.

Side plates 16 are provided at intervals with recesses 92 which provide stations for receiving articles which are positioned on the plates 16. Adjacent each of the recesses 92 there is provided a sensing element or lever 94 which is pivoted to the plates 16 as indicated at 96 and which has an upwardly extending arm 98 carrying a roller 100. As best seen in FIGURE 2, when an article, diagrammatically indicated in this figure at A, is in a particular station, the article engages the roller 100 and depresses it into the notch or recess 92, thus elevating a trigger arm 102 to the position shown at the left of FIGURE 2. If no article is present at the station, a condition which is illustrated at the right in FIGURE 2, then the lever 94 assumes a generally vertical position and its lower trigger portion 102 extends downwardly into the path of a roller 104 mounted on a pin 106 which also provides the pivot connection between the link 80 and the upper strip segment 69.

Carried by the slide 34 which includes the bars 36 are a plurality of carriers 110. Each carrier is connected to the slide 34 by a pair of parallel links 112. Fixedly connected to one of the links 112 is an elevating finger 114. Also fixedly connected to one of the links 112 is an arm 115 carrying a return finger 116 adapted to cooperate with an inclined cam 118 fixedly mounted on one of the plates 16.

The parts are illustrated in FIGURE 2 in a condition in which the right hand station is vacant and the next posterior station contains an article A. It will be understood that the articles are advanced from left to right as seen in this figure and in FIGURES 3-8.

Figure 3:
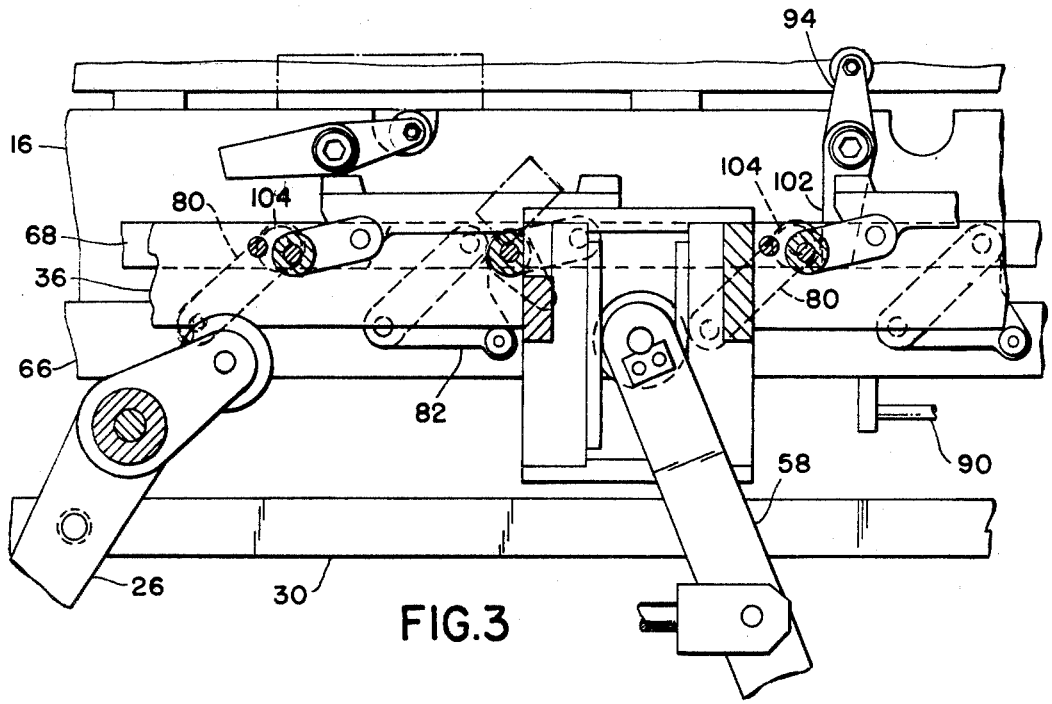
FIGURES 3–8 are views similar to FIGURE 2 showing the parts in the positions occupied in successive phases of operations.

Due to the presence of the article A at the station shown, the lever 94 at the left is in a position such that its trigger portion 102 is elevated in a position above the path of movement of the roller 104 carried by the link 80. On the other hand, due to the absence of the article at the station at the right, the lever 94 has assumed a substantially vertical position and its trigger portion 102 extends downwardly in the path of movement of a roller 104. At this time, operated by suitable time controls which are not illustrated herein, the sensing and control mechanism 65 is actuated by a forward and rearward movement of the continuous strip 66. During initial movement of the strip 66 the segmental strip 68 moves therewith as a unit. However, the roller 104 after predetermined movement, engages the trigger portion 102 of the lever 94. This condition is illustrated in FIGURE 3 where it will be observed that the right hand roller 104 has moved into engagement with the trigger 102.

Figure 4:
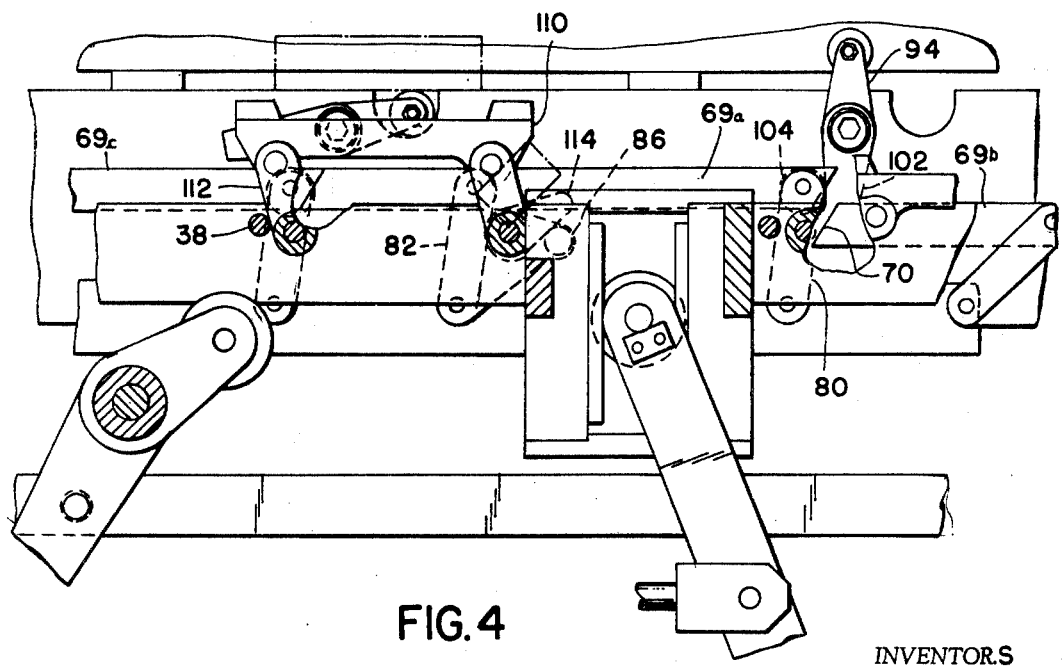

Further movement of the strip 66 to the right results in swinging the link 80 in counterclockwise direction. Due to the parallel linkage comprising the links 80 and 82, the strip segment designated 69a carrying the roller 104 which engaged the trigger portion 102 of the lever 94, is elevated as illustrated in FIGURE 4. It will be observed that the preceding segmental strip designated 69b in this figure has not been elevated because of the presence of an article at the preceding station which prevented direct actuation and indirect actuation, as will now be described.

Referring again to FIGURE 4 it will be observed that a third strip segment here designated 69c, is also in elevated position. This is because the left hand inclined end of the strip segment 69a is in engagement with the right hand inclined end of the strip segment 69c so that upward and rearward movement of the segment 69c directly results in identical movement of the strip segment 69c and further, of all strip segments 69 to the rear or left of the strip segment 69c.

This results in swinging movement of the link 82 carrying the roller 86. Upward swinging movement of the roller 86 in conjunction with its movement to the right resulting from movement of the continuous strip 66, causes the roller 86 to engage the elevating finger 114. This condition is also illustrated in FIGURE 4 and it will be observed that swinging movement of the finger 114 through the agency of the parallel links 112 elevates the carrier 110 to an operative position. Upward and rearward swinging movement of the links 112 is terminated by engagement with the stop pin or rod 38 as clearly seen in this figure. The position of the carrier 110 and the links 112 represents an over-center condition so that when the segmental strips 69 return to their lower position, they leave the selected carriers 110, which are to advance articles to a subsequent station, in the elevated operative position.

Figure 5:
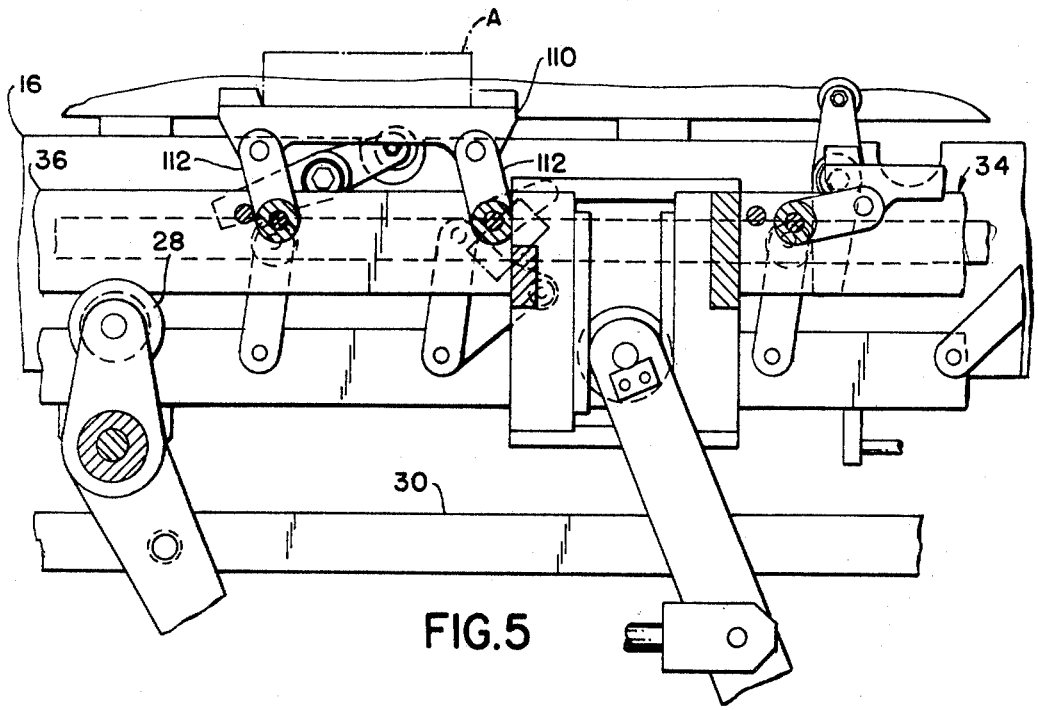

Referring now to FIGURE 5, the next step in the sequence of operation is a swinging of the several lever arms 26 connected by the link 30 in a counterclockwise direction, thus raising the rollers 28 which support the slide 34 and directly engage the lower edges of the longitudinally extending bars 36 of the slide 34. Upward movement of the slide 34 including the bars 36 as illustrated in FIGURE 5, elevates the carriers 110 into the illustrated position in which they have engaged the underside of the articles A and have raised them clear of the frame plates 16.

Figure 6:
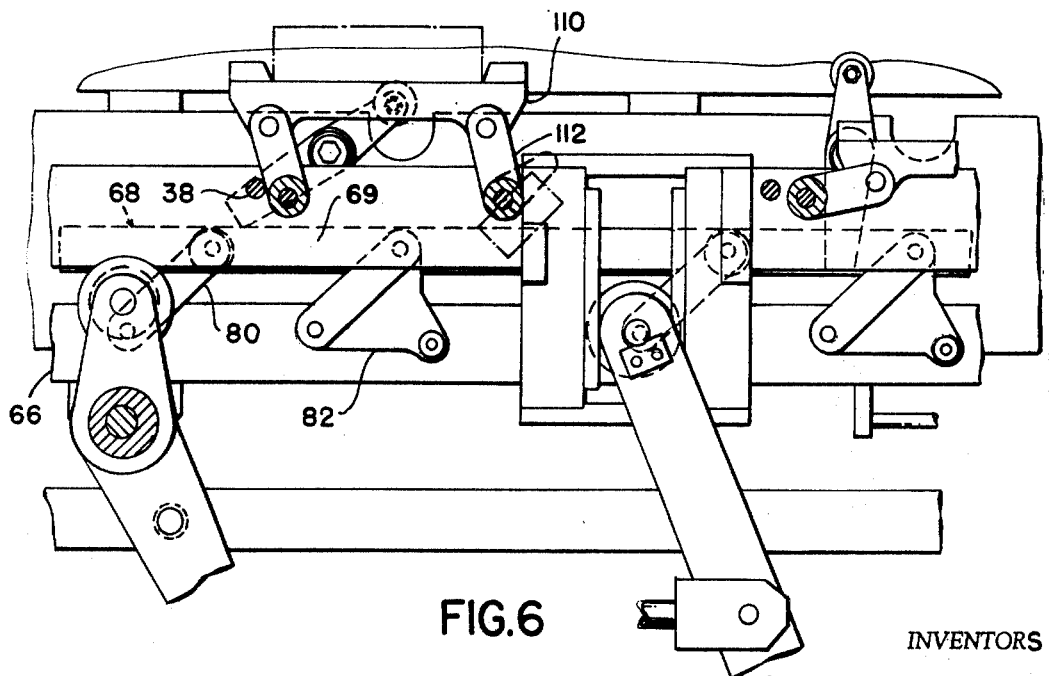

Once the sensing and control device including the strips 66 and 68 has functioned to set the selected carriers 110 in elevated position, the lower strip 68 may be returned to its initial position. In FIGURE 6 there is illustrated the arrangement of parts in which the control strip 66 has been returned to the left and the upper segmented control strip including the several segments 69 has been lowered by rocking movement of the links 80, 82.

Figure 7:
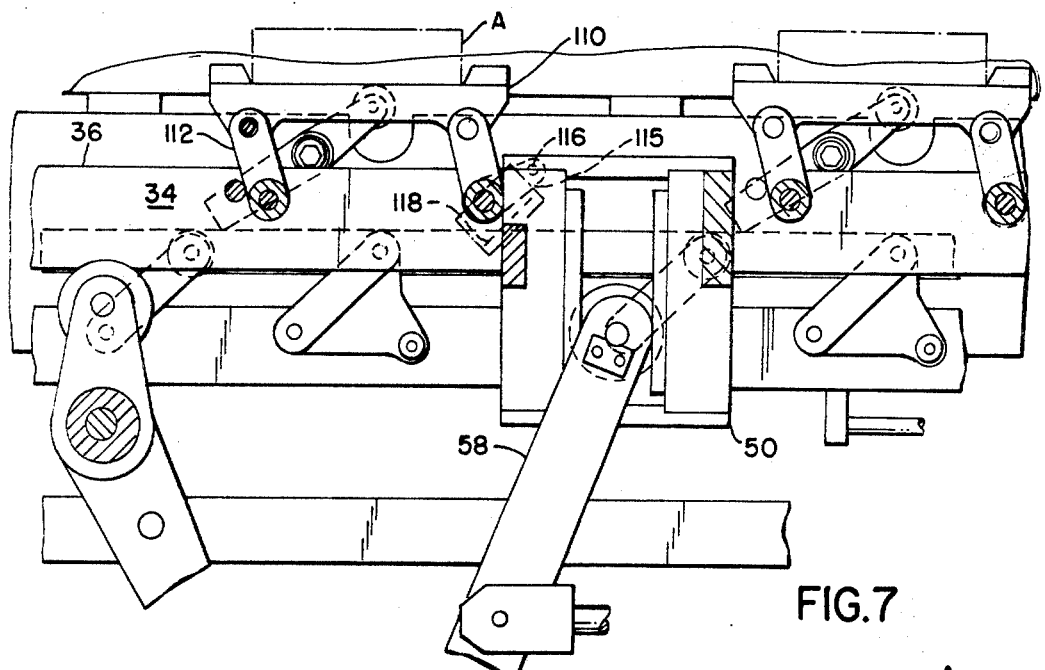

The succeeding step in the sequence of operations is illustrated in FIGURE 7 where it will be observed that the lever structure 58 has been swung in a clockwise direction moving the member 50 and the slide 34 including the strips or bars 36 to the right. Movement of the slide 34 to the right of course results in identical movement of the carriers 110 and of the articles A supported thereby. Thus, this step in the sequence results in advancing an elevated article from one station to a position located directly above the next succeeding station. It will be observed that during this motion the finger or pin 116 carried by the arm 115 moves over the inclined camming plate 118.

Figure 8:
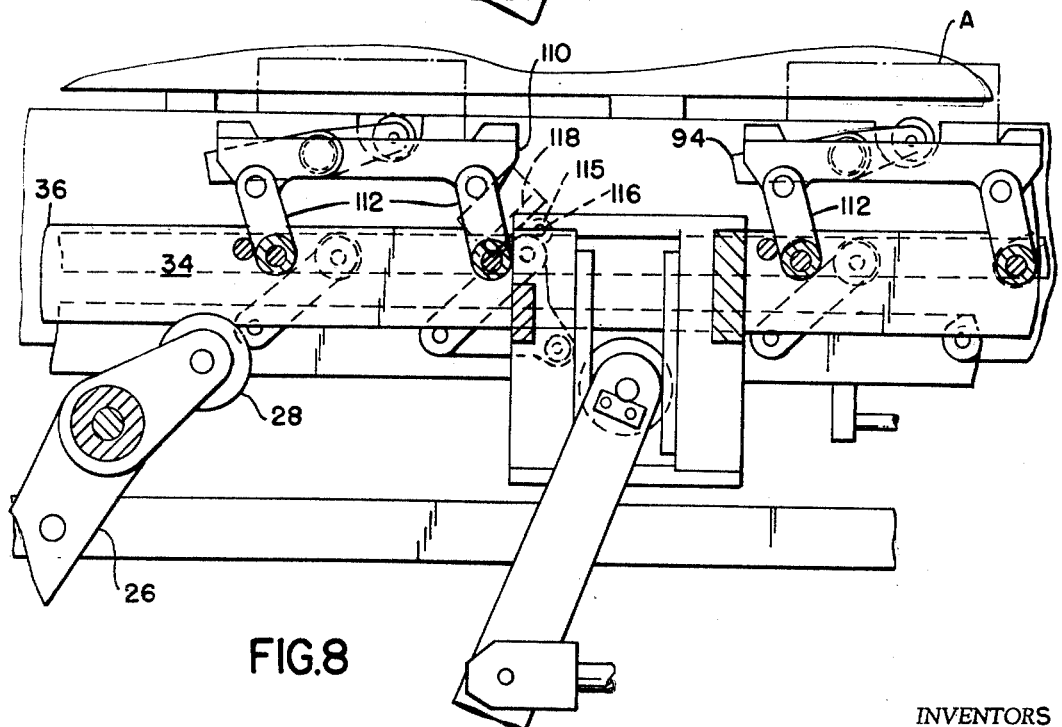

Referring now to FIGURE 8 the next step is the reverse clockwise swinging movement of the lever 26 causing the rollers 28 to move downwardly and to permit downward movement of the slide 34, thus depositing the articles into position on the frame plates 16 at the next succeeding station. It will be observed in FIGURE 8 that this movement of the article A shown at the right of the figure, into the illustrated position will have swung the sensing lever 94 to a position such that the next forward and return stroke of the sensing and control device will not result in upward movement of a strip segment 69 unless such movement is occasioned by triggered elevation of a strip segment located ahead of such segment. It will further be observed that downward movement of the slide 34 has resulted in downward movement of the pin 116 carried by the arm 115 so that it occupies the horizontal plane of the inclined camming plate 118. Accordingly, on the return stroke of the slide 34 resulting from rocking movement of the lever 58, the pin 116 will engage the underside of the plate 118 and will rock the links or fingers 112 in a clockwise direction, thus returning all of the carriers which were previously elevated to the lower inoperative position.

In the foregoing description the fingers 112 are moved into an over-center position and the carriers 110 drop by gravity to the lower inoperative position. If preferred of course, instead of a single plate 118, double plates having an opening therebetween could be provided so that the carriers 110 move downwardly at a rate controlled by the rate of return movement of the slide 34.

From the foregoing it will be observed that the transfer system comprises a series of longitudinally aligned stations, means for sensing the presence or absence of an article at every station, means for preventing the advance of an article to the final or delivery station until an article has been removed therefrom, and for simultaneously preventing the advance of articles unless an intermediate station is vacant. If the final or delivery station is vacant the articles at every station preceding the final or delivery station are first elevated, then advanced a distance equal to the spacing between stations, and lowered into position at the next succeeding station.

The mechanism for controlling the advance of an individual article includes a carrier having a lower inoperative position and an upper operative position, and means for raising the carrier from inoperative to operative position in accordance with the conditions sensed in the system.

The system is entirely mechanical in operation. The control of the piston and cylinder devices or equivalent mechanism which effects movement of the sensing and control device and swinging movement of the levers 26 and 58, may of course be electrical if desired. On the other hand, it is entirely possible to provide mechanical sequencing means. Thus for example, movement of the control strip 66 to the right and left may continue without actuating other devices so long as all stations of the system remain filled. If however, any station in the system is vacant there will result an upward movement of one or more segmental strips 69 so that in any event the strip segment at the left of the system, as illustrated in FIGURE 2 for example, is elevated, thus elevating the associated carrier 110. Upward movement of the initial segment 69 may be used to initiate operation of the valve admitting pressure fluid to the cylinder containing the piston connected to the piston rod 32, and movement of the lever 26 will result in raising the slide 34 to the elevated position shown in FIGURE 5. Upward movement of the slide 34 to this position may be used to actuate the valve admitting pressure fluid to the cylinder containing the piston connected to the piston rod 64, thus initiating movement of the slide 34 to the right to advance the articles to the next succeeding stations. Movement of the slide 34 to the right hand limit of its stroke may reverse the valve associated with the cylinder containing the piston connected to the piston rod 32, thus lowering the slide 34 and depositing the articles at the proper stations. Completion of swinging movement of the lever 26 in clockwise direction may reverse the valve supplying fluid under pressure to the cylinder containing the piston connected to the piston rod 64, thus effecting return motion of the slide 34 to its initial position to the left, simultaneously causing the carriers 110 to be returned to initial idle position. The cylinder containing the piston connected to the piston rod 90, which results in back and forth movement of the control strip 66, may have associated therewith control valve mechanism effective to cause continuous back and forth reciprocation of the control strip 66 until an article advancing phase is triggered by elevation of the initial or left hand strip segment 69, at which time the valve controlling movement of the strip 66 will be closed and will remain closed until an article advancing sequence has been completed, return movement of the lever 58 to the left being effective to initiate a further succession of reciprocations of the control strip 66. With this arrangement, so long as all of the stations remain filled, the only movements occurring are the back and forth reciprocations of the continuous strip 66 and the segmented strip 68 made up of the individual strip segments 69. This may of course be timed to occur at any convenient interval, such for example as every few seconds. When a vacant station is sensed the control strip 66 returns to its left hand initial position and will remain there while the succeeding operations take place in sequence as previously suggested.

The drawings and the foregoing specification constitute a description of the improved transfer system in such full, clear, concise and exact terms as to enable any person skilled in the art to practice the invention, the scope of which is indicated by the appended claims.

What we claim as our invention:

1. A transfer system comprising a series of spaced stations including a starting station at which articles are normally deposited serially, a delivery station from which articles are normally removed serially, and a plurality of intermediate stations through which articles are normally advanced intermittently and from which individual articles may be removed, sensing means associated with the system to determine empty stations, a carrier at each station except the delivery station, means responsive to the absence of an article at the delivery or any intermediate station for elevating the carrier at the station to the rear of such empty station from idle to feed position, control means responsive to the movement of any one carrier to feed position to move all carriers to the rear of said one carrier to operative position, feed means to operate all carriers in operative position to elevate and advance the articles thereat to the next succeeding station and to lower the articles and deposit them at the next succeeding station, said sensing means and said control means both being mechanical means including aligned independently movable members each having a feed position in which the associated carrier is elevated to article carrying height and an idle position in which the associated carrier is below article carrying height, and mechanical abutment means operable by direct positive engagement between each pair of adjacent members effective when any one member is shifted from idle to feed position to mechanically shift the next adjacent member from idle to feed position and thus to shift all members in the same direction as said next adjacent member from said one member in the same direction.

2. A system as defined in claim 1, said control means including a segmented bar comprising a bar segment for each station, said segments constituting said independently movable members and including abutments acting between said segments so that upon movement of any one segment, all segments in rear of said one segment are similarly moved.

3. A system as defined in claim 2, said sensing means comprising a member at each station having an operative position in the absence of an article at said station in which it is in the path of one bar segment to move such segment to elevate the carrier at the preceding station.

4. In a transfer system, a slide, a plurality of carriers pivoted to said slide by parallel linkage for movement from a lower idle position to an elevated operative position, stop means to position said carriers in elevated overcenter positions, means for raising selected carriers to elevated position comprising separate actuators for each carrier movable to raise the associated carrier and to leave it in elevated overcenter position, means for sequentially raising, longitudinally traversing, lowering and reversely traversing said slide, carrier return means operable by reverse traverse of said slide to return said carriers to lower idle positions on said slide, said separate actuators comprising an elongated bar, a plurality of abutting bar segments carried by said bar and individually movable relative to said bar, and means associated with each segment for raising an associated carrier to operative position.

5. A system as defined in claim 4 in which said carrier return means comprises a stationary cam for each carrier and cam engaging means connected to each carrier movable above said cam on the forward stroke of said slide and engageable therewith on the return stroke, each of said cams having surfaces engageable with said cam engaging means to control return movement of said carriers as a function of the rate of movement of said slide.

6. A system as defined in claim 4 in which said bar segments are each connected to said bar by a pair of parallel links.

7. A system as defined in claim 4 comprising means for effecting movement of said bar prior to upward movement of said slide to set each of said carriers in required position prior to initiation of the cyclical movement of said slide comprising upward, forward, downward and rearward movement thereof.

References Cited
UNITED STATES PATENTS

| | | | |
|---|---|---|---|
| 3,322,259 | 5/1967 | Milazzo | 198—219 |
| 3,369,650 | 2/1968 | Caretto | 198—219 |

EDWARD A. SROKA, Primary Examiner